United States Patent
Nakano et al.

(10) Patent No.: US 9,344,641 B2
(45) Date of Patent: May 17, 2016

(54) PHOTOGRAPHING CONTROLLER FOR CONTROLLING PHOTOGRAPHING EXECUTED BY A PLURALITY OF CAMERAS

(71) Applicant: CASIO COMPUTER CO., LTD., Shibuya-ku, Tokyo (JP)

(72) Inventors: Kanako Nakano, Kunitachi (JP); Kazuto Yamamoto, Akishima (JP); Shohei Sakamoto, Fussa (JP); Jun Muraki, Hamura (JP); Hideaki Matsuda, Adachi-ku (JP); Koki Nakamura, Sakado (JP); Kazuma Kawahara, Akishima (JP); Hiroyoshi Ogawa, Koganei (JP); Toshihiko Yoshida, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 70 days.

(21) Appl. No.: 14/274,067

(22) Filed: May 9, 2014

(65) Prior Publication Data

US 2014/0362246 A1 Dec. 11, 2014

(30) Foreign Application Priority Data

Jun. 7, 2013 (JP) ................................. 2013-120433

(51) Int. Cl.
*H04N 5/247* (2006.01)
*H04N 5/232* (2006.01)

(52) U.S. Cl.
CPC ........... *H04N 5/247* (2013.01); *H04N 5/23206* (2013.01)

(58) Field of Classification Search
CPC ... H04N 5/247; H04N 5/23206; H04N 5/235; H04N 5/2352; H04N 5/2353; H04N 5/2354; H04N 5/2355; H04N 5/2356; H04N 5/238; H04N 5/243
See application file for complete search history.

(56) References Cited

U.S. PATENT DOCUMENTS

| | | | | |
|---|---|---|---|---|
| 8,063,942 B2* | 11/2011 | Hung | ..................... | H04N 5/235 348/222.1 |
| 9,066,023 B2* | 6/2015 | Shirakawa | ............. | H04N 5/247 |
| 2007/0223901 A1* | 9/2007 | Fujimoto | ............... | G03B 17/00 396/56 |
| 2014/0333800 A1* | 11/2014 | Sugie | .................. | H04N 5/2355 348/229.1 |
| 2015/0189153 A1* | 7/2015 | Fujinawa | ........... | H04N 1/00127 348/207.11 |

FOREIGN PATENT DOCUMENTS

| | | |
|---|---|---|
| JP | 2003-324649 A | 11/2003 |
| JP | 2004-235781 A | 8/2004 |
| JP | 2006-246355 A | 9/2006 |
| JP | 2012-070336 A | 4/2012 |

* cited by examiner

*Primary Examiner* — Nicholas Giles
(74) *Attorney, Agent, or Firm* — Holtz, Holtz & Volek PC

(57) ABSTRACT

A master camera sets temporary conditions at the time of executing photographing by a plurality of cameras, determines whether photographing by the plurality of cameras can be executed under the temporary conditions, sets actual conditions at the time of executing photographing by the plurality of cameras in accordance with this determination result, and executes control such that photographing by the plurality of cameras is executed under the actual conditions.

20 Claims, 9 Drawing Sheets

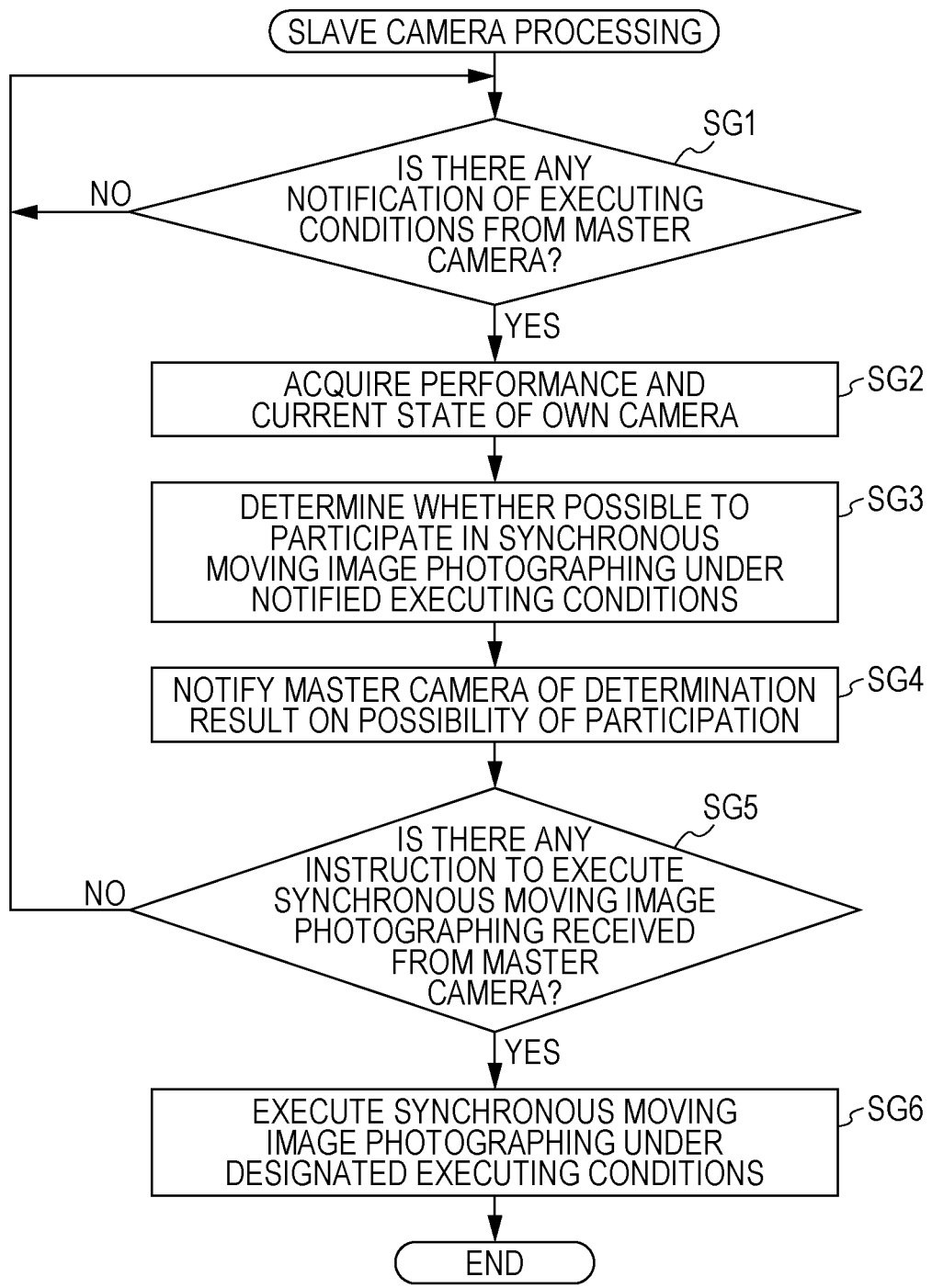

PHOTOGRAPHING CONTROLLER FOR CONTROLLING PHOTOGRAPHING EXECUTED BY A PLURALITY OF CAMERAS

BACKGROUND OF THE INVENTION

1. Field of the Invention

The present invention relates to a photographing controller, camera, a photographing control program (recording medium), a photographing control method, and a camera system, provided with a function to control photographing executed by a plurality of cameras.

2. Description of the Related Art

In a related art, there is a photographing method in a camera system in which moving images of a same subject are synchronously photographed by a plurality of cameras from different directions and a plurality of moving images photographed is synchronously reproduced (JP 2003-324649 A, for example). A camera used in this photographing method has functions of a master camera and a slave camera, and in the case of being selected as the master camera, the master camera collects registered information, a state immediately before photographing and performance information of other cameras selected as the slave cameras, and generates integral photographing conditions based on the collected information. After that, the generated integral photographing conditions are supplied to each of the slave cameras, and photographing is executed in each of the slave cameras, interlocking with operation of a release shutter button of the master camera. In this manner, it is possible to obtain the moving images of the same subject synchronously photographed from the different directions.

SUMMARY OF THE INVENTION

According to an aspect of the present invention, a photographing controller includes:

a temporary conditions determining unit configured to determine temporary conditions at the time of executing photographing by a plurality of cameras, a determining unit configured to determine whether photographing by the plurality of cameras can be executed under the temporary conditions, an actual conditions determining unit configured to determine actual conditions at the time of executing photographing by the plurality of cameras in accordance with a determination result by the determining unit, and a control unit configured to control setting of the actual conditions in the plurality of cameras.

Additionally, according to another aspect of the present invention, a camera photographing control method includes:

determining temporary conditions at the time of executing photographing by a plurality of cameras;

determining whether photographing by the plurality of cameras can be executed under the temporary conditions;

determining actual conditions at the time of executing photographing by the plurality of cameras in accordance with a determination result by the determining processing; and controlling setting of the actual conditions in the plurality of cameras.

Further, according to still another aspect of the present invention, a non-transitory recording medium includes a program which causes a computer to function as:

a temporary conditions determining unit configured to determine temporary conditions at the time of executing photographing by a plurality of cameras;

a determining unit configured to determine whether photographing by the plurality of cameras can be executed under the temporary conditions;

an actual conditions determining unit configured to determine actual conditions at the time of executing photographing by the plurality of cameras in accordance with a determination result by the determining unit; and a control unit configured to control setting of the actual conditions in the plurality of cameras.

BRIEF DESCRIPTION OF THE DRAWING

FIG. 9 is a flowchart illustrating a procedure of the slave camera processing according to the second embodiment.

DETAILED DESCRIPTION OF THE PREFERRED EMBODIMENTS

Figure 1A:
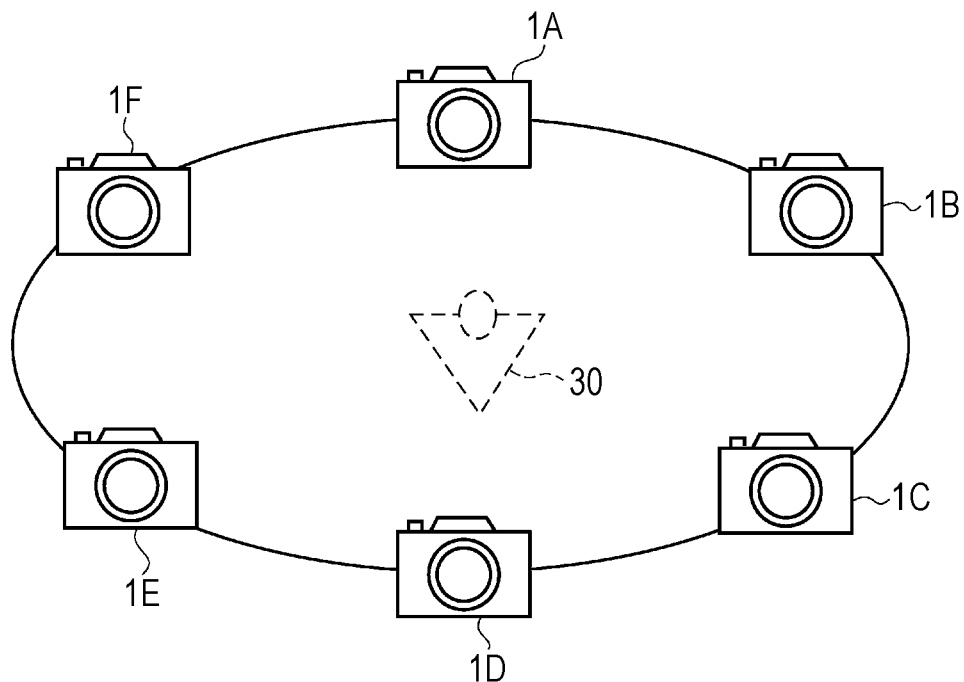
FIG. 1A is a diagram illustrating an exemplary arrangement at the time of photographing by a camera system according to an embodiment of the present invention.

An embodiment of the present invention will be described below with reference to the attached drawings. FIG. 1A is an explanatory diagram illustrating a camera system common in respective embodiments of the present invention. This camera system includes six cameras, from a first camera 1A to a sixth camera 1F (hereinafter, collectively referred to as cameras 1). These cameras 1 are arranged at substantially equal intervals so as to surround a subject 30 (for instance, a golfer who swings a golf club) in order to photograph moving images of the subject 30 from the surrounding area.

Figure 2:
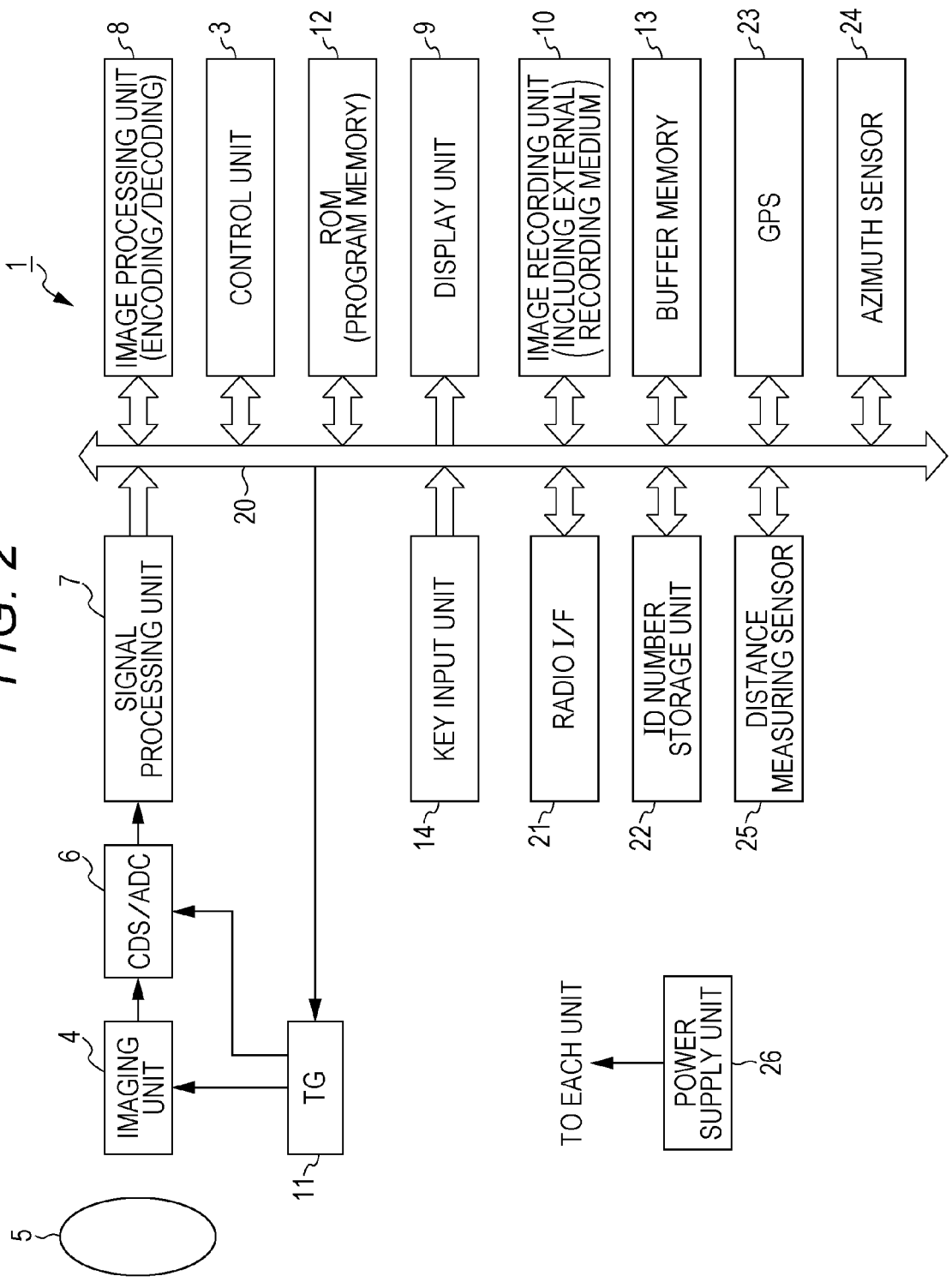
FIG. 2 is a block configuration diagram of a camera according to an embodiment of the present invention.

FIG. 2 is a block diagram illustrating a schematic configuration of the cameras 1. According to the present embodiment, the cameras from the first camera 1A to the sixth camera 1F have a common configuration illustrated in the drawing. More specifically, the cameras 1 each include a control unit 3 connected to each unit via a bus line 20, and the control unit 3 is a one-chip microcomputer that controls each unit of the camera 1. An imaging unit 4 includes a CMOS image sensor and is disposed on an optical axis of an imaging lens 5 formed of a focus lens, a zoom lens, etc., and configured to output an analog imaging signal corresponding to an optical image of the subject to each line by a line exposure sequential reading system (rolling shutter) in which each line has a different exposure timing.

The unit circuit 6 is a circuit to receive the analog imaging signal corresponding to the optical image of the subject output from the imaging unit 4, and includes a CDS that stores the received imaging signal, a gain adjusting amplifier (AGC) that amplifies the imaging signal, an A/D converter (ADC) that converts the amplified imaging signal to a digital imaging signal, and so on. An output signal from the imaging unit 4 is transmitted to a signal processing unit 7 via a unit circuit 6 as an each digital signal.

Various kinds of signal processing is applied to this transmitted digital signal at the signal processing unit 7, and the digital signal is transmitted to an image processing unit 8 where various kinds of image processing is applied, and then displayed as a through image by being supplied to a display unit 9. Further, at the time of recording the image, the signal processed at the image processing unit 8 is encoded to be stored in an image recording unit 10 (including an external recording medium). At the time of reproducing the image, the image data read out from the image recording unit 10 is decoded at the image processing unit 8 to be displayed on the display unit 9.

Additionally, the bus line 20 is connected to a TG (Timing Generator) 11, ROM 12, and a buffer memory 13. TG 11 generates a frame synchronizing signal (sensor V synchronous signal) having timing and a frame period set by the control unit 3, and drives the imaging unit 4, the unit circuit 6, and an LED 17 at the timing in accordance with the frame synchronizing signal. The ROM 12 also stores program AE data and an EV value table. The program AE constitutes a program diagram illustrating combination of an aperture value (F) and a shutter speed corresponding to an appropriate exposure value (EV) at the time of respective photographing such as still image photographing and moving image photographing. After that, a charge accumulation time set by the control unit 3 based on the shutter speed set by the program diagram is supplied to the imaging unit 4 as a shutter pulse via the TG 11, and the imaging unit 4 operates in accordance with the supplied shutter pulse, thereby controlling an exposure period and exposure timing. Moreover, the ROM 12 stores programs illustrated in flowcharts which will be described later and various kinds of programs necessary to function as a digital camera.

A buffer memory 13 is a buffer to temporarily store the image data, etc. and also used as, for example, a working memory of the control unit 3. More specifically, the image processing unit 8 applies processing such as pedestal clamp to Bayer data transmitted from the signal processing unit 7, and then converts the data to RGB data, and further converts the RGB data to a luminance (Y) signal and a color difference (UV) signal. One frame portion of YUV data converted at the image processing unit 8 is stored in a buffer memory 13. The one frame portion of the YUV data stored in the buffer memory 13 is transmitted to the display unit 9 and converted to a video signal therein, and then displayed as the through image.

Meanwhile, when user operation of a shutter key is detected in a still image photographing mode, still image photographing processing is executed by switching the imaging unit 4 and the unit circuit 6 to a driving method and drive timing for the still image photographing which are different from the through image photographing. By thus executing the still image photographing processing, the one frame portion of the YUV data stored in the buffer memory 13 is encoded after being compressed at the image processing unit 8, such as JPEG compression, to be filed in the buffer memory 13. After that, the data is recorded in the image recording unit 10 as the still image data via the bus line 20.

Further, when an instruction of photographing start is detected in the moving image photographing mode, photographing starts and a plurality of frame portions of the YUV data is stored in the buffer memory 13 until a photographing finish instruction is detected. The plurality of frame portions of the YUV data stored in the buffer memory 13 is transmitted to the control unit 3 after the photographing finish instruction is given, and the data is encoded after being compressed by, for example, JPEG compression (predetermined MPEG codec in the case of the moving image photographing), and then assigned with a file name as a frame data via the buffer memory 13 and the bus line 20 to be recorded in the image recording unit 10. Further, at the time of reproducing the still image or the moving image, the control unit 3 expands the data of the still image or the moving image read out from the image recording unit 10 and develops the expanded data as the frame data of the still image data or the moving image in an image data work area of the buffer memory 13.

Further, the bus line 20 is connected to a key input unit 14, a radio I/F 21, an ID number storage unit 22, a Global Positioning System (GPS) 23, an azimuth sensor 24, and a distance measuring sensor 25. The key input unit 14 includes a plurality of operation keys such as a shutter key, a mode setting key and a power key, and detects a key input signal corresponding to the key operation by a user and outputs the signal to the control unit 3.

The radio I/F 21 is an interface that links other cameras via near field communication such as Bluetooth (registered trademark). The ID number storage unit 22 stores an individual ID number different in each of the cameras 1A to 1F (according to the present embodiment, natural number different from one another), and also includes a list area storing the ID numbers acquired from other cameras. The GPS 23 receives radio waves transmitted from a plurality of positioning satellites (GPS satellite) via a GPS receiving antenna, thereby acquiring positional data including latitude/longitude indicating a current position and supplying the acquired positional data to the control unit 3 as positional information indicating the current position of the camera. The azimuth sensor 24 detects a direction of an optical axis of the imaging lens 5 in the camera, and supplies the direction to the control unit 3 as a photographing direction. The distance measuring sensor 25 detects a distance to the subject, particularly, a distance to a specific subject described later and supplies the distance to the control unit 3.

In addition, the power supply unit 26 includes a battery and supplies power to each unit from the battery.

First Embodiment

Figure 3:
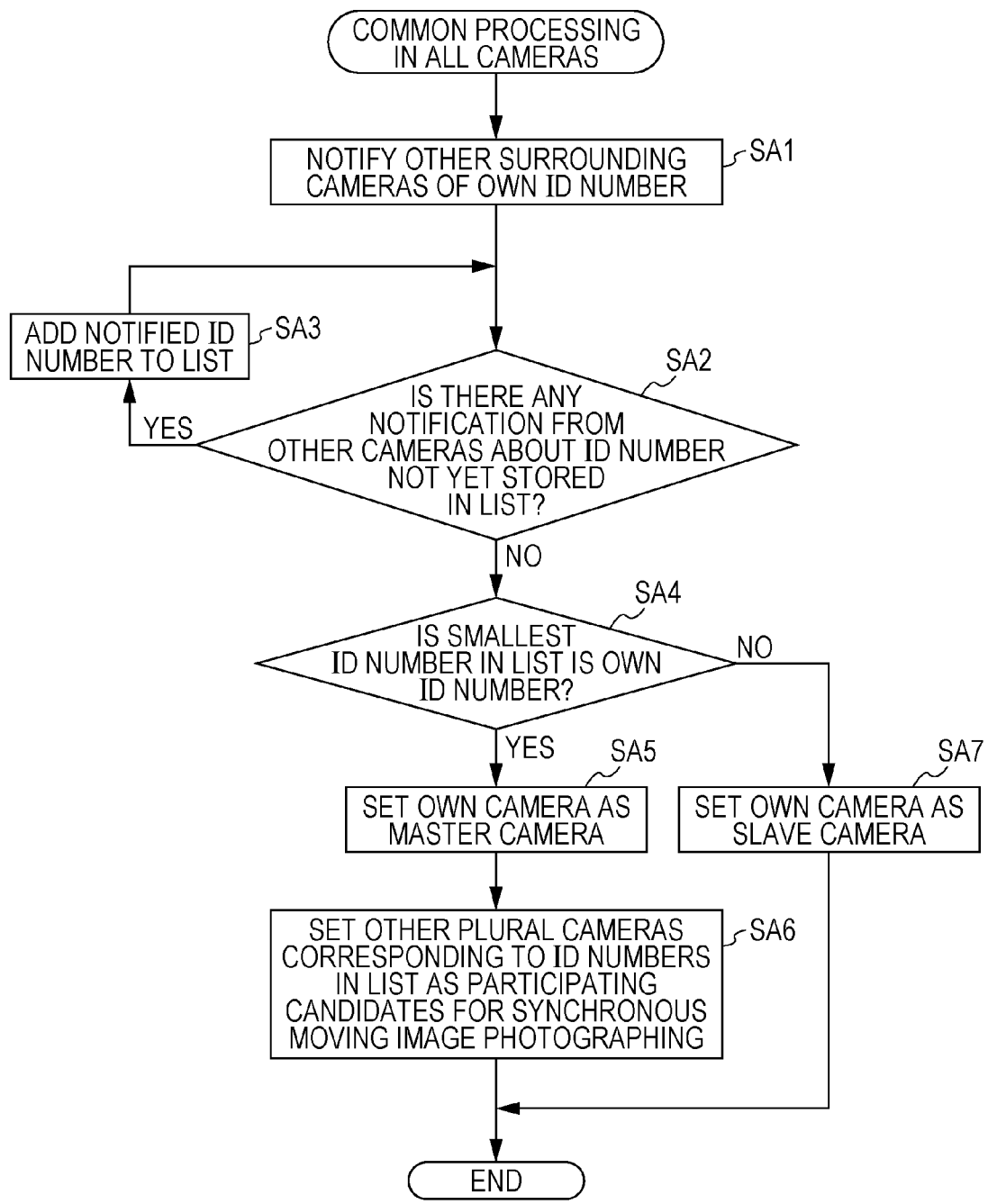
FIG. 3 is a flowchart illustrating a procedure of processing in all cameras at the time of synchronous photographing.

According to the present embodiment having the above-described configuration, when a synchronous photographing mode is set in each of the cameras 1 by the user operation at the key input unit 14, the control unit 3 executes, in accordance with the program stored in the ROM 12, master/slave determining processing illustrated in the flowchart of FIG. 3 and common in all of the cameras. More specifically, the control unit 3 transmits the ID number unique to each camera and stored in its own ID number storage unit 22 from the radio I/F 21 to the outside, and notifies other cameras of the ID number via near field radio (Step SA1).

Substantially, determination is made whether any notification of an ID number not yet stored in its own list (ID number storage unit 22) is received (Step SA2). In the case where there is a notification of an ID number not yet stored in its own list from other cameras, the ID number notified is added to the list (Step SA3) and the processing returns to Step S2. Therefore, according to the present embodiment, loop processing of Step SA2→SA3→SA2 is repeated until the ID numbers of the six cameras from the first camera 1A to the sixth camera 1F are stored in the list of each of the cameras 1. Further, by repeating the loop processing, the same list storing the ID numbers of the six cameras from the first camera 1A to the sixth camera 1F is generated in the ID number storage unit 22 in each of the cameras 1.

Next, each of the cameras 1 determines whether the smallest ID number in the same list (storing the ID numbers of the six cameras) is the own ID number (Step SA4). In the case where the smallest ID number is not the own ID number, this camera is set as a slave camera (Step SA7), and the master/slave determining processing ends.

Figure 1B:
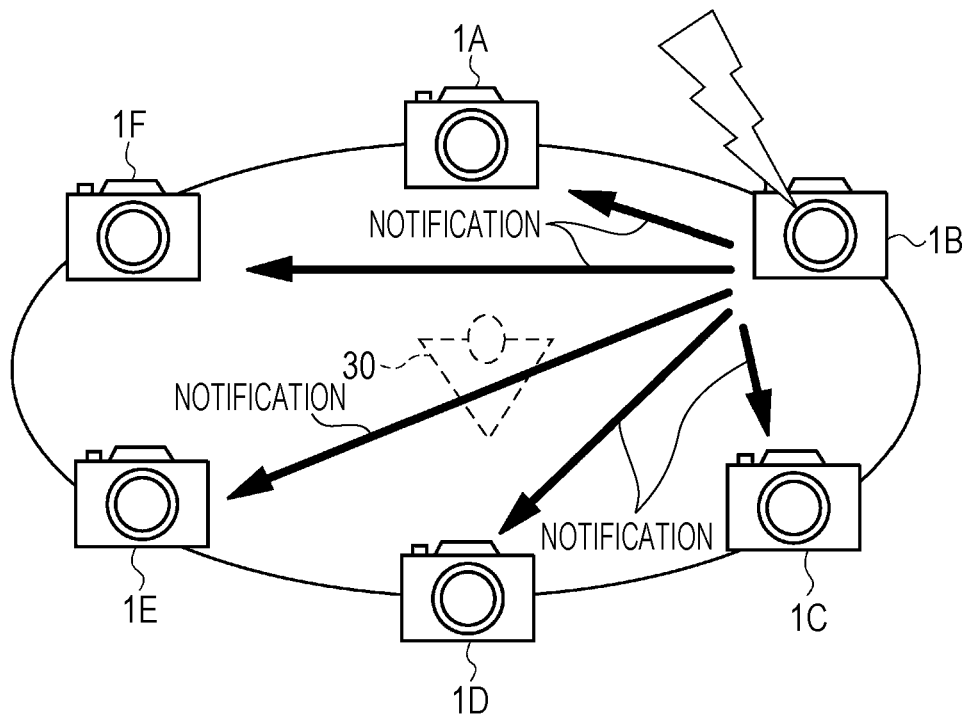
FIG. 1B is an explanatory diagram for operation in a case where a camera 1B is a master camera.

Further, in the case where the smallest ID number is the own number, this camera is set as a master camera (Step SA5). Therefore, the processing up to Step SA5 is executed in the camera system illustrated in FIG. 1, thereby determining one of the six cameras from the first camera 1A to the sixth camera 1F as the master camera and determining five others as the slave cameras. For instance, as illustrated in FIG. 1B, the camera 1B is determined as the master camera and the cameras 1A, 1C, 1D, 1E and 1F are determined as the slave cameras.

Thus, according to the present embodiment, the camera having the smallest ID number is configured to be the master camera, and therefore master camera determining processing is simple, and photographing can be started quickly. Needless to say, the determining processing is not limited thereto, and it is possible to compare control performance (performance of the control unit 3) of the respective cameras to determine a camera 1 having the most excellent control performance as the master camera. In this manner, an entire system can be controlled accurately by effectively utilizing the camera having the excellent performance.

After that, the plurality of cameras corresponding to the ID numbers in the list including an own camera are determined as participating candidates for synchronous photographing (Step SA6), and then the master/slave determining processing ends. Therefore, the above-described master/slave determining processing is executed in the camera system illustrated in FIG. 1A, thereby determining the master camera and the slave cameras ad described and also determining the cameras from the first camera 1A to the sixth camera 1F as the participating candidates for the synchronous photographing.

According to the present embodiment, therefore, determination of the master/slave cameras in the cameras constituting the camera system and in the camera system can be automatically executed without user's manual designating operation, thereby simplifying preparative operation before executing the synchronous photographing.

Needless to say, it is also possible to determine the master/slave cameras in the cameras constituting the camera system and in the camera system by the user operating at the key input unit 14. In this manner, the user's intention can be reflected in determining the master/slave cameras for the cameras included in the camera system, and further the camera system may include optional cameras and any of optional cameras can be determined as the master camera.

Figure 4:
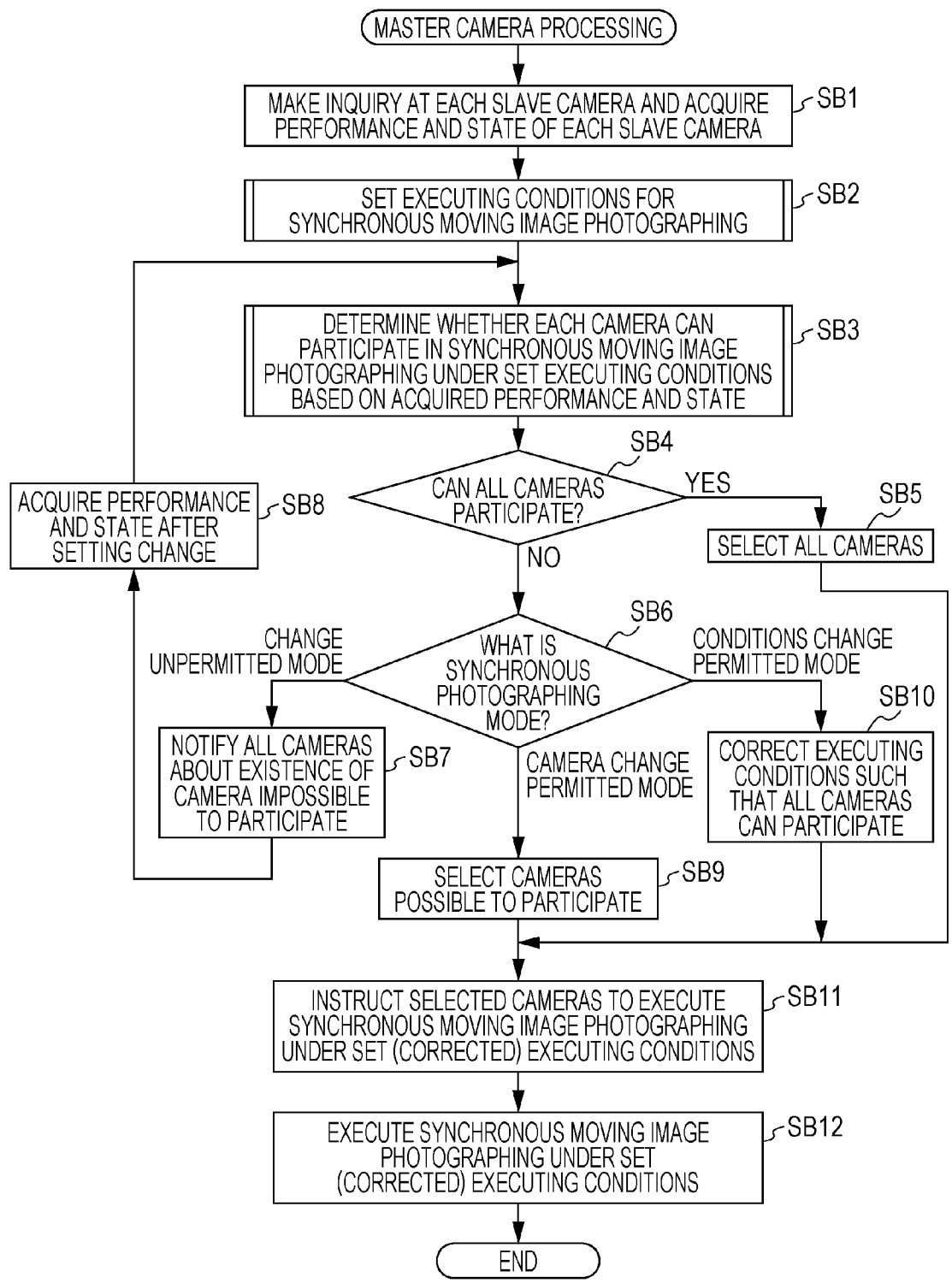
FIG. 4 is a flowchart illustrating a procedure of master camera processing according to a first embodiment of the present invention.

FIG. 4 is a flowchart illustrating a procedure of master camera processing, executed by the control unit 3 included in a camera set as the master camera (hereinafter, simply referred to as master camera) in the above-described processing in Step SA5. The control unit 3 of the master camera makes an inquiry at each camera set as the slave camera (hereinafter referred to as slave camera) in the above-described processing in Step SA7, and acquires performance and a state of each slave camera (Step SB1). More specifically, when the master camera transmits a transmission request for the performance and the state of the slave camera from the radio I/F 21 to the outside (see FIG. 1B), the slave camera transmits the performance and the state of each own camera in response to the request. Then, the control unit 3 of the master camera allows the radio I/F 21 to receive and store information indicating the performance and the state transmitted from each slave camera.

Meanwhile, the information indicating the performance and the state of each camera used in Step SB1 will be described later at the time of describing processing executed in the flowchart illustrated in FIG. 6.

After that, the control unit 3 of the master camera executes setting of executing conditions to set the executing conditions for synchronous moving image photographing (hereinafter referred to as synchronous moving image photographing) (Step SB2). The executing conditions set in Step SB2 are temporary conditions set as temporary conditions at the time of executing synchronous photographing by the plurality of cameras.

Subsequently, determining processing for possibility of participation is executed to determine whether each of the cameras can participate in the synchronous moving image photographing executed under the set executing conditions based on the acquired performance and the state of the slave cameras (Step SB3).

Since the executing conditions used for this determination are based on the performance and the state of each slave camera acquired in Step SB1, all of the cameras satisfy the executing conditions in high possibility. In other words, since the acquired performance and state of the slave cameras are considered at the time of making this determination, the number of the cameras determined to be able to participate in the synchronous moving image photographing can be increased as much as possible.

Meanwhile, the processing procedure in Step SB2 and Step SB3 will be described later more in detail with reference to FIGS. 5 and 6.

After that, determination is made whether all of the cameras can participate in the synchronous moving image photographing under the set executing conditions based on a determination result in Step SB3 (Step SB4). In the case where all of the cameras can participate under the set executing conditions, it indicates there is no problem, and therefore all of the cameras corresponding to ID numbers written in the list are selected (Step SB5). Subsequently, selected cameras (all of cameras) are instructed to execute the synchronous moving image photographing under the set executing conditions (Step SB11). Further, the master camera itself also executes the synchronous moving image photographing under the set executing conditions (Step SB12).

Therefore, under the relatively high-level executing conditions (photographing conditions) set by the master camera, the synchronous moving image photographing can be executed by all of the cameras 1, namely, by the maximum number of the cameras in the system.

Additionally, in the case where all of the cameras can participate in the synchronous moving image photographing under the executing conditions thus set, the executing conditions are not corrected (Step SB10 described later), and only in the case where all of the cameras cannot participate, the executing conditions are corrected (Step SB10 described later). Accordingly, while the executing conditions are prevented from lowering, the number of photographing executed by the cameras synchronous participating can be maximized.

However, in the case where it is determined in Step SB4 that all of the cameras cannot participate in the synchronous moving image photographing under the set executing conditions, in other words, in the case where there is a camera that cannot participate in the synchronous moving image photographing under the set executing conditions, determination is made in which mode the synchronous photographing mode is preliminarily set at the master camera, "change unpermitted mode", "camera change permitted mode" or "conditions change permitted mode" (Step SB6).

Here, note that "change unpermitted" in the "change unpermitted mode" indicates: non-permission to change the set executing conditions, more specifically, it is unpermitted to change the executing conditions and also unpermitted to change the number of the cameras included in the system. In other words, all of the cameras from the first camera 1A to the sixth camera 1F are used to execute the synchronous moving image photographing because of this non-permission to change the camera. Accordingly, in the case where the "change unpermitted mode" indicating the above-described meaning is set, all of the cameras included in the present camera system are notified, via the near field radio, that there is a camera that cannot participate (Step SB7). Then, as described below, the camera that cannot participate executes setting change and transmits the performance and state after the setting change to the master camera. The master camera receives and acquires the changed performance and state (Step SB8).

Therefore, all of the cameras included in the present camera system can constantly share the most updated information related to the performance and state of other cameras, and smooth operation of the present camera system can be expected.

After that, the processing returns to Step SB3. Therefore, in the case where there is a camera that cannot participate in the synchronous moving image photographing while the "change unpermitted mode" is set, the loop processing of Step SB3→SB4→SB6→SB7→SB8→SB3 is repeated. Meanwhile, when all of the cameras are notified that there is a camera that cannot participate in Step SB7, which camera cannot participate is also notified by, for example, the ID number. Therefore, by executing the processing in Step SB7, all of the slave cameras can identify existence of a camera that cannot participate inside the system and also which camera (itself or not) cannot participate.

Further, which one of the slave cameras cannot participate is notified by the ID number or the like in the above-described loop processing, and then the processing returns to Step SB3. Subsequently, as described later in a flowchart of FIG. 7, the camera notified to be the camera that cannot participate executes the setting change such that the camera can participate, and a result after the setting change is notified to the master camera. Therefore, while the loop processing of Step SB3→SB4→SB6→SB7→SB8→SB3 is repeated, sometimes all of the cameras may be able to participate. As a result, the processing proceeds to Step SB5→SB11→SB12 from Step SB4 of the loop processing.

Therefore, in the case where the "change unpermitted mode" is set, the synchronous moving image photographing is also executed by all of the cameras 1, namely the maximum number of the cameras in the system, under the relatively high executing conditions (photographing conditions) set by the master camera. Therefore, since the photographing conditions are relatively high-level, highly-qualified synchronous photographing image can be obtained, and further, multidirectional synchronous photographing can be executed by maximizing the number of the cameras that can participate in the synchronous photographing.

On the other hand, in the case where the "camera change permitted mode" is set, the control unit 3 forwards the processing to Step SB9 from Step SB6. Then, a slave camera that cannot participate is excluded, and a slave camera that can participate is selected (Step SB9). After that, the above-described processing in Step SB11 and SB12 is executed.

Therefore, in the case where the "camera change permitted mode" is set, the number of the cameras participating in the synchronous moving image photographing is reduced, but the executing conditions (photographing conditions) are kept at the relatively high level as it has been set by the master camera. Accordingly, the highly-qualified synchronous photographing image can be obtained because the relatively high-level photographing conditions are kept.

Further, in the case where the "conditions change permitted mode" is set, the control unit 3 forwards the processing to Step SB10 from Step SB6. Then, the executing conditions are corrected such that all of the cameras can participate in the synchronous moving image photographing (Step SB10). The conditions corrected in Step SB10 are actual conditions at the time of executing the synchronous moving image photographing.

After that, the above-described processing in Step SB11 and SB12 is executed. Therefore, in the case where the processing is executed as described above, the number of the cameras that can participate in the synchronous photographing is increased although the photographing conditions level is lowered. Accordingly, setting the "conditions change permitted mode" may be suitable for a case in which clarity of the images is not demanded but moving images of a subject are demanded to be photographed from multiple directions. Further, the high-level photographing conditions may solve the problem in the related art in that the number of the cameras that can participate in the synchronous photographing is reduced although the highly-qualified synchronous photographing image can be obtained.

In this instance, the master camera first confirms whether all of the cameras can participate in the above-described Step SB4 and then corrects (changes) the executing conditions only in the case where there is a camera that cannot participate. Therefore, since correcting (changing) the executing conditions is limited to the case where there is a camera that cannot participate, mitigation by correcting (changing) the executing conditions may be limited. Accordingly, the synchronous moving image photographing can be performed with a large number of cameras (all of cameras), preventing the level of the executing conditions from lowering to the utmost. Accordingly, since the level of the photographing conditions from lowering is prevented to the utmost, a highly-qualified synchronous photographing image can be obtained and also the multidirectional synchronous photographing can be executed by maximizing the number of the cameras that can participate in the synchronous photographing.

Additionally, since the above-mentioned respective modes are set by the user operation at the key input unit 14, a photographing result satisfying the user's expectation can be obtained from the synchronous photographing using the plurality of cameras 1.

Also, when the processing is executed in accordance with the flowchart illustrated in FIG. 4, in the case of setting the actual conditions by changing the temporary conditions, the temporary conditions are set by selecting either a method of excluding a candidate camera determined impossible to participate in the synchronous photographing without changing the executing conditions or a method of changing the executing conditions without excluding the candidate camera determined impossible to participate in the synchronous photographing. Therefore, when the user selects and sets one mode suitable for the characteristics of the subject, the moving image photographing can be performed in a flexible manner;

for example, prioritizing the number of the cameras that can participate in the synchronous photographing at the expense of the quality of the photographing image, or prioritizing a higher quality of the synchronous photographing image at the expense of the number of the cameras that can participate in the synchronous photographing.

Further, in the case where priority is set in the plurality of cameras 1 in advance and the photographing conditions whereby all of the plurality of cameras may have the same photographing state cannot be set, the executing conditions may be corrected such that the photographing state or individual photographing conditions of the camera having high priority is prioritized. In this manner, priority setting for the cameras can be changed in each different synchronous photographing, and the camera having high priority can be placed at an important photographing position. Further, a photographing result of the synchronous moving image photographing can be obtained with an additional value satisfying the purpose.

Figure 5:
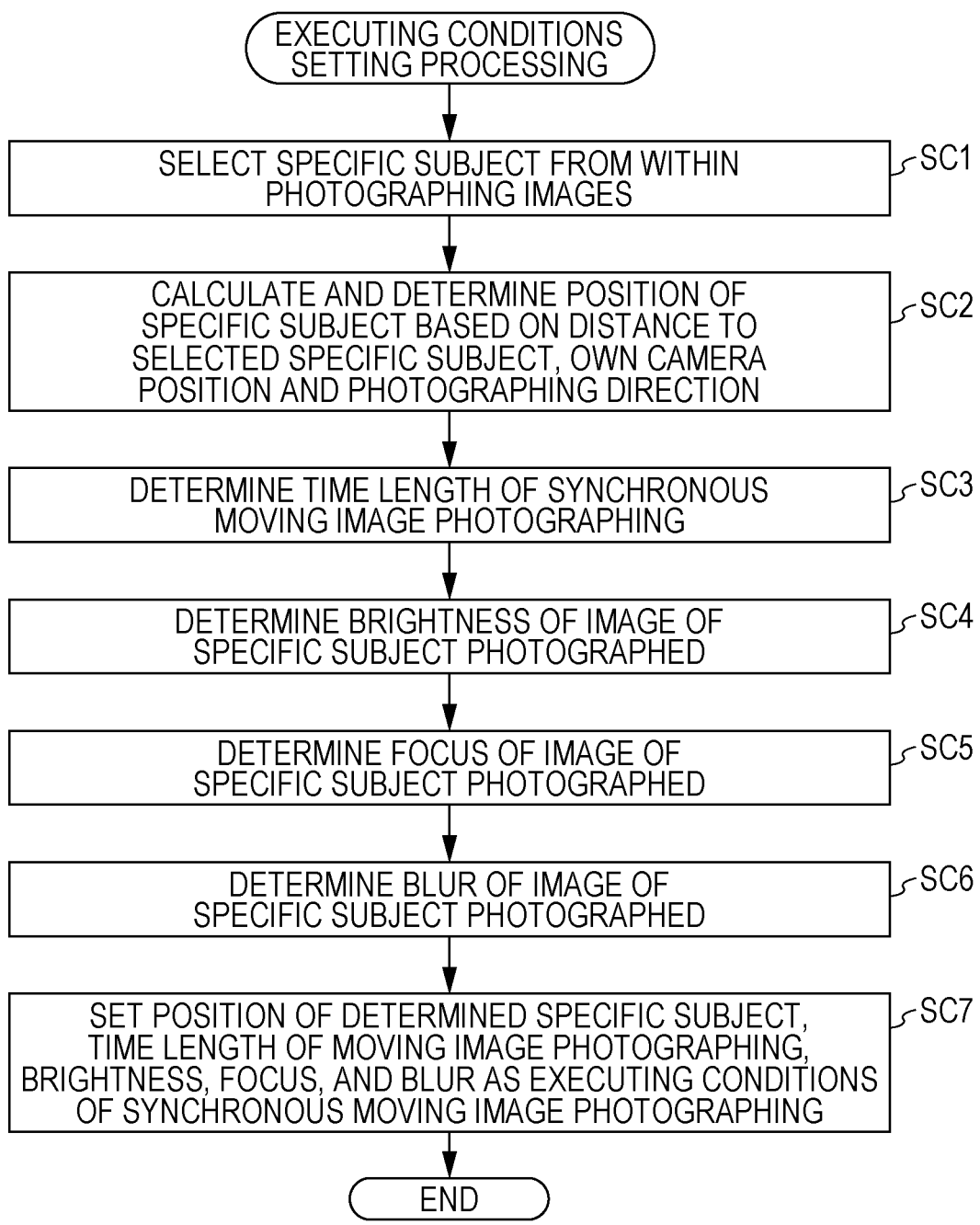
FIG. 5 is a flowchart illustrating a procedure of executing conditions setting processing.

FIG. 5 is a flowchart illustrating details of the executing conditions setting processing (Step SB2). The control unit 3 of the master camera selects a specific subject from among images included in the photographing images, more specifically, the images currently on-camera and displayed on the display unit 9 as the through image (Step SC1). By thus selecting the specific subject, the target of the synchronous moving image photographing can be set with pinpoint accuracy. Note that this specific subject selection may be executed, for example, by the control unit 3 automatically selecting the subject inside a focus frame displayed on the through image of the display unit 9 or by selecting a certain subject inside the through image as the specific subject in response to the user's manual operation at the key input unit 14.

Next, a position of the specific subject is calculated, more specifically, an absolute coordinate of the specific subject is calculated and determined based on a distance to the specific subject detected by starting up the distance measuring sensor 25, an own position obtained from positional information of the GPS 23, and a photographing direction supplied from the azimuth sensor 24 (Step SC2). Additionally, a time length of the synchronous moving image photographing is determined (Step SC3).

The time length of the synchronous moving image photographing may be determined by an optional time input by the user at the key input unit 14, for example, "5 minutes", or may be automatically determined by setting a fixed time value such as "5 minutes".

Further, brightness of the image at the time of photographing the specific subject is determined (Step SC4). Accordingly, as described later in Step SC7, the determined brightness of the image is to be an executing condition of the moving image photographing. Therefore, once the brightness of the image at the time of photographing is determined in Step SC4, all of the cameras 1 execute the moving image photographing with the same brightness. Therefore, when frame images photographed by the respective cameras 1 at the same time point are combined to create a panorama image, there is no difference in brightness among the frame images and a highly-qualified natural panorama image without a sense of incompatibility can be obtained.

Subsequently, a focus of the image of the photographed specific subject is determined (Step SC5). Determining the focus in Step SC5 may be executed by a basic method whereby the focus is determined so as to bring the specific subject into focus, but the method is not limited thereto, and the focus may be determined so as to bring the specific subject out of focus.

Further, a blur of the image having photographed the same specific subject is determined (Step SC6). More specifically, a shutter speed is determined for all of the cameras 1, thereby determining the blur of image in the case where the specific subject is a dynamic subject like a golfer who swings a golf club. This allows the respective cameras 1 to photograph the specific subject with the same blur, and stereoscopic images can be displayed by the plurality of moving images reproduced with the same blur when the moving images photographed by the respective cameras 1 are synchronously reproduced.

The position of the specific subject, the time length of the moving image photographing, the brightness, focus, and blur of the moving images that have been determined through the above processing are set as the executing conditions (photographing conditions) of the synchronous moving image photographing (Step SC7), and the executing conditions are set in Step SB2 in the flowchart in FIG. 4 above described.

Figure 6:
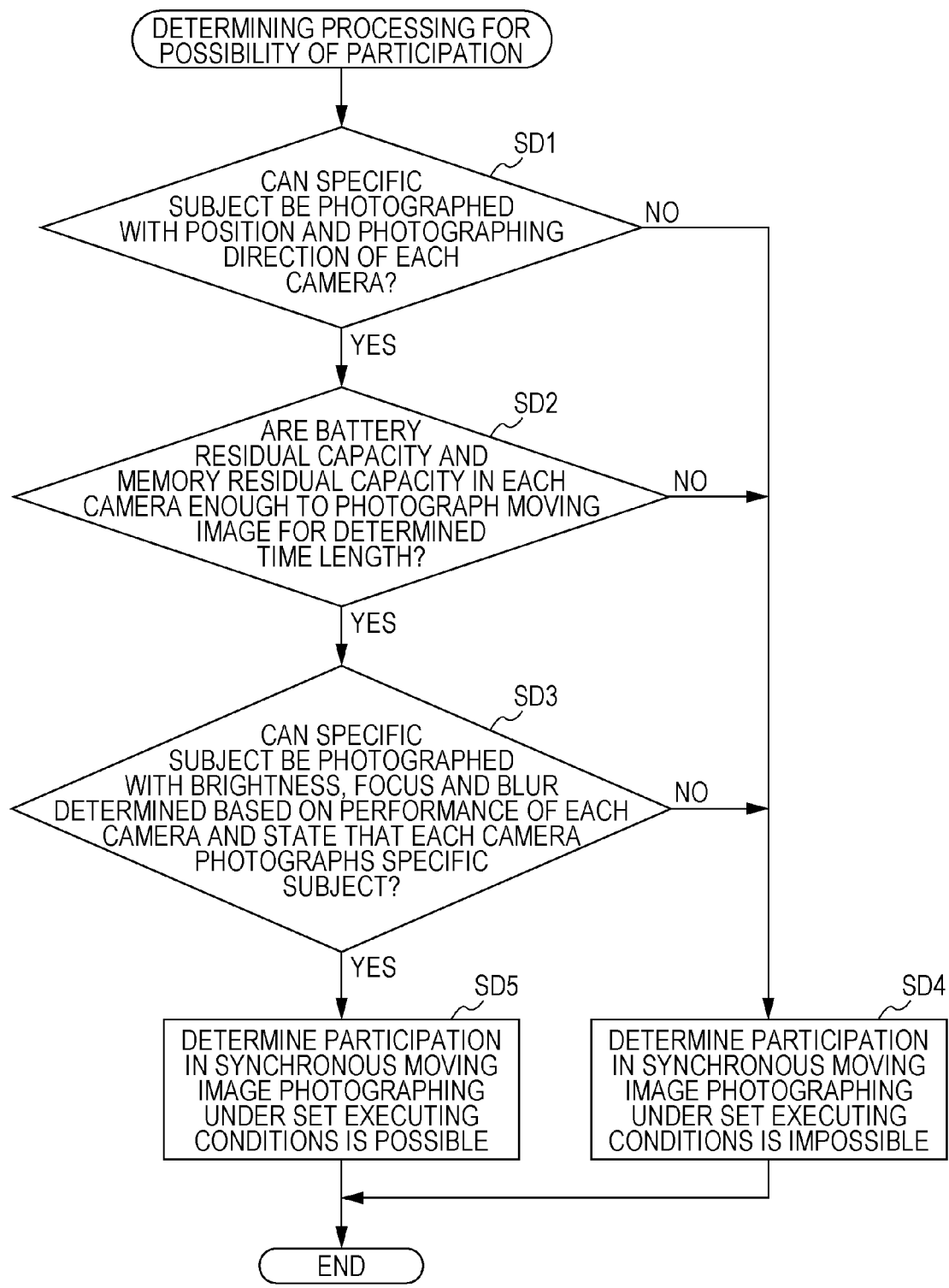
FIG. 6 is a flowchart illustrating a procedure of determining processing for possibility of participation.

FIG. 6 is a flowchart illustrating details of the processing for determining possibility of participation executed in Step SB3 described above. The control unit 3 of the master camera determines whether photographing the determined specific subject can be executed with the position and photographing direction of each camera included in the performance and state of each slave camera transmitted and received from each of the slave cameras (Step SD1). In the case where photographing can be executed, the processing proceeds to Step SD2, and in the case where photographing cannot be executed, the processing proceeds to Step SD4.

Then, in the case where the processing proceeds to Step SD4, it is determined that the slave camera cannot participate (impossible to participate) in the synchronous moving image photographing under the set executing conditions.

In Step SD2, determination is made whether battery residual capacity of the power supply unit 26 and the memory residual capacity of the image recording unit 10 included in each of the cameras are enough to photograph the moving image for the determined time length. In the case where the determination is NO in Step SD2, the processing proceeds to Step SD4, and in the case of YES, the processing proceeds to Step SD3.

Therefore, the determination in Step SD2 satisfies one of important conditions in the synchronous moving image photographing, that is, photographing can be executed for the same time length.

Next, in Step SD3, the master camera determines whether photographing of the specific subject can be executed with determined brightness, focus and blur based on the performance of each camera and the state each camera photographs the specific subject (Step SD3). Then, in the case where the determination in Step SD3 is NO, the processing proceeds to the above-described Step SD4 where participation in the synchronous moving image photographing is determined impossible, and the determining processing for possibility of participation ends for the slave camera.

Further, in the case where the determination in Step SD3 is YES, the processing proceeds to Step SD5 where participation in the synchronous moving image photographing under the set executing conditions is determined possible, and the determining processing for possibility of participation ends.

Therefore, determination in Step SD3 serves to satisfy one of the important conditions in the synchronous moving image photographing that all of the cameras execute photographing under the same state.

Meanwhile, a determining factor of the photographing state may be a single constituent element selected from any one of the brightness, blur, focus, and shade of color of the subject, and the photographing conditions may be a single constituent element selected from any one of the exposure time, diaphragm, sensitivity, and camera shake correcting function; however, not limited thereto, the determining factors and the photographing conditions may be suitably combined of the mentioned constituent elements. Thus, setting of the conditions for the synchronous moving image photographing can be executed considering the characteristics of the subject such as movement thereof.

The determining processing for the possibility of participation including the above-described Steps SD1 to SD5 illustrated in FIG. 6 is executed for each of the slave cameras of which the performance and state have been acquired. At this point, in the determining processing for the possibility of participation in FIG. 6, determination is made whether the synchronous moving image photographing can be executed under the executing conditions based on the position and photographing direction of each camera transmitted from the slave camera (Step SD1), the battery residual capacity of the power supply unit 26, the memory residual capacity of the image recording unit 10 (Step SD2), and determination on whether the specific subject can be photographed with the brightness, focus, blur of the image determined based on the performance of each camera and the state of the specific subject to be photographed by each camera (Step SD3). Therefore, the information indicating the performance and state of each camera used in Step SB1 includes at least the position and photographing direction of the slave camera, the battery residual capacity of the power supply unit 26, the memory residual capacity of the image recording unit 10, and the brightness, focus, blur of the image determined based on the performance of each camera and the state that each camera photographs the specific subject.

Figure 7:
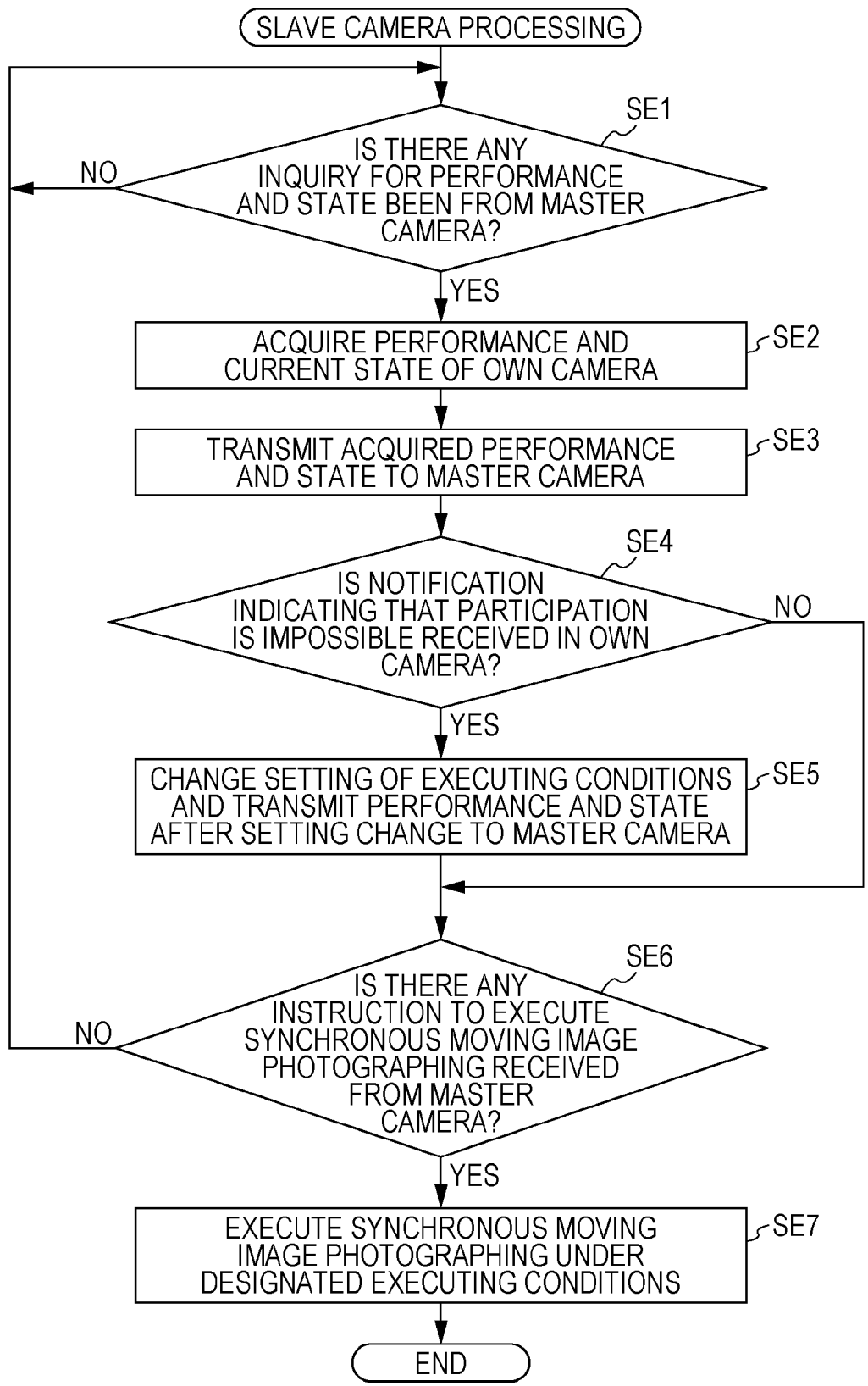
FIG. 7 is a flowchart illustrating a procedure of slave camera processing according to the first embodiment of the present invention.

FIG. 7 is a flowchart illustrating a processing procedure of the slave camera executed by the control unit 3 of the slave camera. The control unit 3 of each slave camera waits until an inquiry (transmission request) for the performance and state is transmitted from the master camera (Step SE1). In the case where the transmission request for the performance and state is received from the master camera via the radio I/F 21, the control unit 3 of the slave camera acquires the performance and current state of the own camera including the above-described specific matters (Step SE2), and transmits the acquired performance and current state of the own camera to the master camera (Step SE3).

Further, the control unit 3 of each slave camera determines whether such a notification is received (Step SE4) because, as described above, a notification is transmitted from the master camera regarding impossibility of participation to the camera that cannot participate by the processing in Step SB7. In the case where the notification is received, the setting for the executing conditions is changed such that the camera can participate, and the performance and state finished with the setting change is transmitted to the master camera (Step SE5).

Then, the loop processing from Step SE1 to Step SE6 is repeatedly executed until an instruction for executing the synchronous moving image photographing is received from the master camera (Step SE6). In the case where the instruction for executing the synchronous moving image photographing is received from the master camera by the above-described processing in Step SB11 while executing the loop processing, the control unit 3 of the slave camera executes the synchronous moving image photographing under designated executing conditions (Step SE7).

Needless to mention, there is a slave camera that does not receive the instruction for executing the synchronous moving image photographing from the master camera depending on the above-described executing conditions and the mode. As for the slave camera that does not receive the instruction for execution, a time of the loop processing from Step SE1 to Step SE6 is measured, and when the measured time exceeds a predetermined value, the processing illustrated in FIG. 7 ends.

Otherwise, in Step SB11, the instruction is given to the selected slave cameras to execute the moving image photographing under the set (corrected) executing conditions and simultaneously another instruction is given to the non-selected slave camera to stop (inhibit) executing the moving image photographing. On the other hand, the slave camera determines not only whether the instruction for executing the synchronous moving image photographing is received from the master camera in Step SE6 described above but also whether the instruction for inhibiting the same is received. In the case where the instruction for stopping (inhibiting) execution is received, the processing in the flowchart illustrated in FIG. 7 ends.

After that, the synchronous moving image photographing is executed in accordance with any one of following patterns in the camera system according to the first embodiment.

(1) In the case where all of the cameras can participate in the synchronous moving image photographing under the executing conditions initially set by the master camera, all of the cameras execute the synchronous moving image photographing under the executing conditions. Therefore, in this case, the executing conditions initially set by the master camera are not mitigated and the synchronous moving image photographing is executed by all of the cameras included in the system.

(2) In the case where there is a slave camera that cannot participate in the synchronous moving image photographing under the executing conditions initially set and further the "change unpermitted mode" is set, the master camera does not change and keeps the executing conditions initially set, and executes the setting change such that the slave camera may satisfy the executing conditions from the master camera. Then, the master camera and all of the slave cameras execute the synchronous moving image photographing at the time point when all of the slave cameras come to have the performance and state satisfying the executing conditions initially set by the master camera. Therefore, in this case also, the executing conditions initially set by the master camera are not mitigated, and the synchronous moving image photographing is executed by all of the cameras included in the system.

(3) In the case where there is a slave camera that cannot participate in the synchronous moving image photographing under the executing conditions initially set and further the "camera change permitted mode" is set, the slave cameras that can participate in the synchronous moving image photographing are selected and then the synchronous moving image photographing is executed. Therefore, in this case, the synchronous moving image photographing is executed in some cameras included in the system, but the moving image photographing is executed without mitigating the executing conditions initially set by the master camera.

(4) In the case where there is a slave camera that cannot participate in the synchronous moving image photographing under the executing conditions initially set and also the "conditions change permitted mode" is set, the synchronous moving image photographing is executed after correcting the executing conditions such that all of the cameras can participate. Therefore, in this case, the executing conditions initially set by the master camera are mitigated, but the synchronous moving image photographing is executed by all of the cameras included in the system.

Second Embodiment

Figure 8:
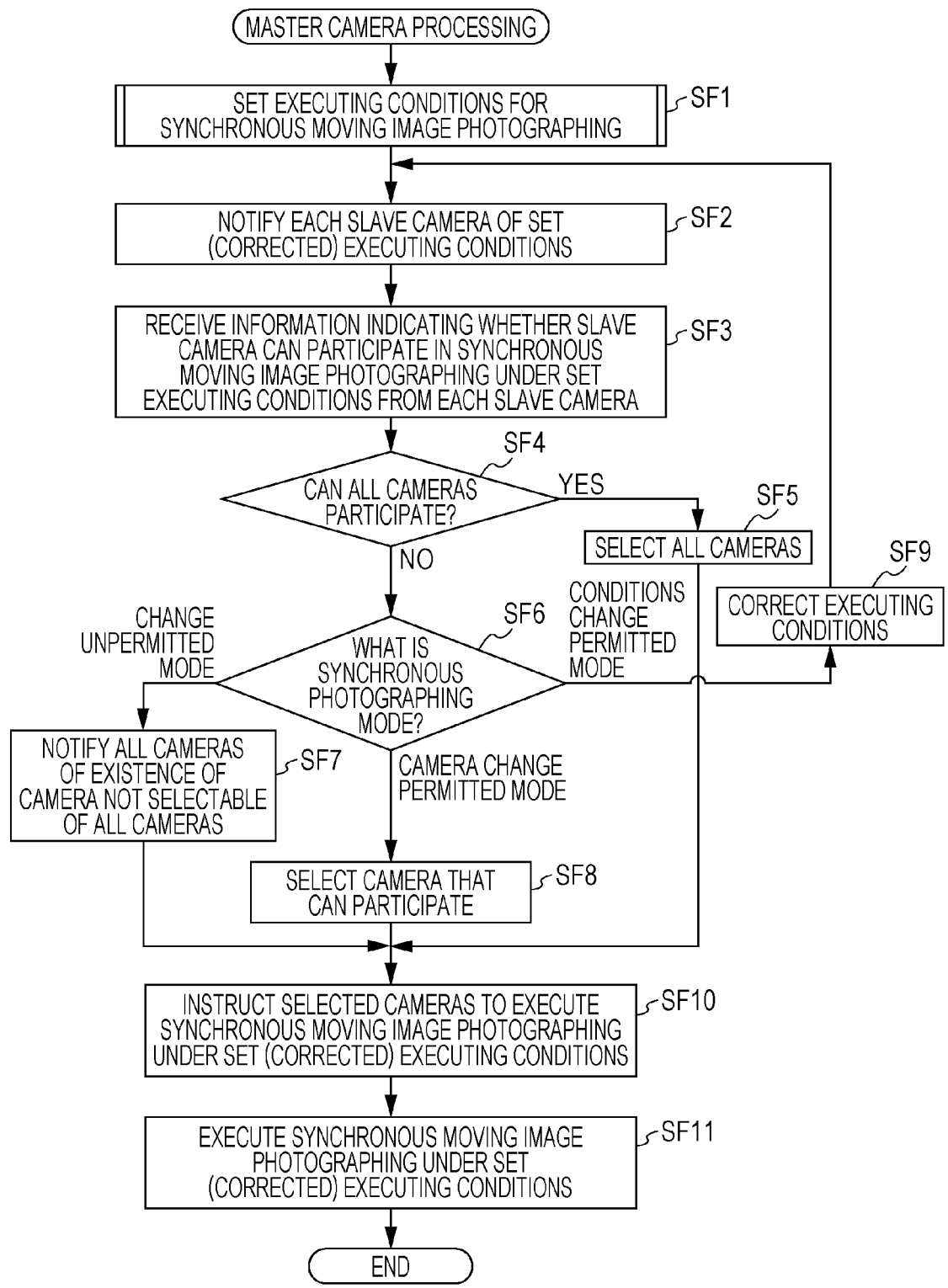
FIG. 8 is a flowchart illustrating a procedure of the master camera processing according to a second embodiment of the present invention.

FIG. 8 is a flowchart illustrating a processing procedure of a master camera according to a second embodiment of the present invention. A control unit 3 of the master camera executes setting processing for executing conditions to set the executing conditions (temporary conditions) for synchronous moving image photographing (Step SF1). The setting processing for the executing conditions (temporary conditions) is executed by a procedure illustrated in a flowchart of FIG. 5 in the same manner as a first embodiment. Therefore, according to the first embodiment, the setting processing for the executing conditions is executed after an inquiry is made to slave cameras to acquire performance and state of the respective slave cameras (Step SB1), but according to the second embodiment, the setting processing for the executing conditions for synchronous moving image photographing is immediately executed without acquiring the performance and state of the respective slave cameras.

Accordingly, the setting for the executing conditions is quickly executed, thereby achieving to early start and finish the synchronous moving image photographing.

Further, the executing conditions set as the temporary conditions by the above-described processing preferably include both conditions: conditions for a plurality of candidate cameras to be participating candidates that participate in the synchronous photographing; and executing conditions for the synchronous photographing to be executed by the respective candidate cameras. After that, determination is made whether all of the plurality of candidate cameras can participate in the synchronous photographing. In the case where it is determined that not all of the candidate cameras can participate in the synchronous photographing, the temporary conditions are changed to set actual conditions within a range in which both the number of the cameras participating in the synchronous photographing and the executing conditions of the respective cameras are kept in a desired state. In this manner, the synchronous moving image photographing can be performed with a large number of cameras while preventing a level of the executing conditions from lowering as much as possible.

After that, the control unit 3 of the master camera transmits the set executing conditions for notification (Step SF2). Then, as described later with a flowchart in FIG. 9, information indicating a determination result on whether a slave camera can participate is transmitted from the slave camera for notification. Therefore, the information indicating whether the slave camera can participate in the synchronous moving image photographing under the set executing conditions is received from each slave camera (Step SF3).

Subsequently, based on a content received in Step SF3, determination is made whether all of the cameras can participate in the synchronous moving image photographing under the set executing conditions (Step SF4). In the case where all of the cameras can participate under the set executing conditions, there is no problem. Accordingly, all of the cameras corresponding to ID numbers written in a list area of an ID number storage unit 22 are selected (Step SF5). Subsequently, an instruction is given to the selected cameras (all of the cameras) for executing the synchronous moving image photographing under the set executing conditions (Step SF10). Further, the master camera itself also executes the synchronous moving image photographing under the set executing conditions (Step SF11).

Therefore, the synchronous moving image photographing can be executed using all of the cameras 1, namely, the maximum number of cameras in the system, under the relatively high-level executing conditions (photographing conditions) set by the master camera.

However, in Step SF4, in the case where it is determined that all of the cameras cannot participate in the synchronous moving image photographing under the set executing conditions, i.e., in the case where there is a camera that cannot participate in the synchronous moving image photographing under the set executing conditions, determination is made in which one of modes the synchronous photographing mode is preliminarily set at the master camera, "change unpermitted mode", "camera change permitted mode" or "conditions change permitted mode" (Step SF6) in the same manner as Step SB6 according to the first embodiment.

Here, note that "change unpermitted" in the "change unpermitted mode" indicates two meanings same as the first embodiment: the set executing conditions are unpermitted to be changed and also the number of the cameras included in the system is unpermitted to be changed, in other words, all of the cameras from a first camera 1A to a sixth camera 1F are to be used to execute the synchronous moving image photographing because of this non-permission to change the camera.

Accordingly, in the case where the "change unpermitted mode" indicating such meanings is set, notification is made to all of the cameras that "change unpermitted mode" is to be executed (Step SF7). Therefore, all of the cameras included in the present camera system can constantly share the most updated information related to the performance and state of other cameras, and smooth operation of the present camera system can be expected.

Subsequently, an instruction is given to execute the synchronous moving image photographing under the set executing conditions (Step SF10), and the master camera itself also executes the synchronous moving image photographing under the set executing conditions (Step SF11). At this point, a slave camera that cannot participate in the synchronous moving image photographing under the set executing conditions executes the synchronous moving image photographing under executing conditions as close to the executing conditions set by the master camera as possible.

Accordingly, in the case where the "change unpermitted mode" is set, the synchronous moving image photographing is executed by using all of the cameras 1, namely, the maximum number of the cameras in the system under the relatively high-level executing conditions (photographing conditions) set by the master camera although some slave cameras participate under low-level executing conditions (photographing conditions). Therefore, since the photographing conditions are relatively high-level, highly-qualified synchronous photographing image can be obtained, and multidirectional synchronous photographing can be executed by maximizing the number of the cameras that can participate in the synchronous photographing.

On the other hand, in the case where the "camera change permitted mode" is set, the control unit 3 forwards the processing to Step SF8 from Step SF6. Then, a slave camera that cannot participate is excluded while a slave camera that can participate is selected (Step SF10). After that, the above-described processing in Step SF11 and SF12 is executed.

Therefore, in the case where the "camera change permitted mode" is set, the number of the cameras participating in the synchronous moving image photographing is reduced, but the executing conditions (photographing conditions) are kept at the relatively high-level set by the master camera. As a result, the highly-qualified synchronous photographing image can be obtained by keeping the relatively high-level photographing conditions.

Further, in the case where the "conditions change permitted mode" is set, the control unit 3 forwards the processing to Step SF9 from Step SF6. Then, after correcting the executing conditions for mitigation (Step SF9), the processing returns to Step SF2 and the corrected executing conditions (actual conditions) are notified to each of the slave cameras. Therefore, in the case where the "conditions change permitted mode" is set, a loop processing of Step SF2→SF3→SF4→SF6→SF9→SF2 is repeated until all of the cameras can participate.

Further, repeating the loop processing results in repeating the processing in Step SF9 multiple times, thereby gradually mitigating the executing conditions (actual conditions). As a result, even though the performance and state are not changed by changing the setting conditions at the plurality of slave cameras, all of the cameras can participate just by the master camera singularly mitigating and changing the executing conditions. In this instance, the master camera confirms whether all of the cameras can participate in above-described Step SF4 and then corrects the executing conditions (actual conditions) only in the case where there is a camera that cannot participate. Therefore, mitigation by correcting the executing conditions is limited because correction of the executing conditions is limited to the case where there is a camera that cannot participate. Accordingly, the synchronous moving image photographing can be performed by a large number of cameras (all of the cameras) while preventing a level of the executing conditions from lowering as much as possible. Consequently, by preventing the level of the photographing conditions from lowering as much as possible, a highly-qualified synchronous photographing image can be obtained and also the multidirectional synchronous photographing can be executed by maximizing the number of the cameras that can participate in the synchronous photographing.

Meanwhile, when the executing conditions are corrected for mitigation in Step SF9, preferably restricting conditions to restrict a range of changing the temporary conditions are designated in accordance with preliminary operation at a key input unit 14 such that the actual conditions are set by changing the temporary conditions within the range of the designated restricting conditions. In this manner, a situation in which excessively low-level actual conditions are set can be prevented before the situation occurring.

Moreover, the restricting conditions preferably include restricting conditions for changing the number of the cameras participating in the synchronous photographing or restricting conditions for the range within which the executing conditions are changed. Since there are the restricting conditions for changing the number of the cameras participating the synchronous photographing, the number of the cameras that synchronously photograph moving images can be kept at the number desired by a user. Also, since there are the restricting conditions for the range within which the executing conditions are changed, a plurality of the moving images synchronously photographed can have an image quality desired by the user.

Additionally, preferably the temporary conditions further includes conditions related to timings to execute the synchronous photographing so as to determine whether all of a plurality of the candidate cameras can immediately participate in the synchronous photographing under the executing conditions. In the case where it is determined that the plurality of the candidate cameras cannot immediately participate in the synchronous photographing under the executing conditions, preferably the actual conditions are set by changing the temporary conditions within a range in which all conditions including the number of the cameras participating in the synchronous photographing, the executing conditions executed by each camera, and a waiting time before executing the synchronous photographing are kept in a desired state.

In other words, the conditions of the synchronous photographing includes conditions related to a speed before executing the synchronous photographing and also the conditions determining whether waiting is necessary in the case where there is a camera that cannot participate. This enables flexible handling by changing three conditions: the number of the cameras participating in the synchronous photographing, executing conditions of the respective cameras, and the timings. As a result, the number of the cameras executing the synchronous moving image photographing can be kept at the number desired by the user, and not only the image quality of the plurality of moving images synchronously photographed can be as desired by the user, but also the photographing can be started at the desired timings.

Therefore, ideal synchronous photographing moving images photographed starting from a desired time point in accordance with movement of a subject can be obtained by the number of synchronous photographing cameras desired by the user, having the image quality desired.

When the above-described master camera processing illustrated in the flowchart of FIG. 8 is executed, in the case of setting the actual conditions by changing the temporary conditions, the temporary conditions are changed by one of following methods: a method of excluding the candidate cameras determined impossible to participate in the synchronous photographing without changing the executing conditions; a method of changing the executing conditions without excluding the candidate cameras determined impossible to participate in the synchronous photographing; and a method of waiting until all of the cameras can participate in the synchronous photographing.

Therefore, according to the second embodiment also, in the case where the user selects and sets the mode suitable for the subject characteristics, the synchronous moving image photographing can be performed in a flexible manner; for example, prioritizing the number of the cameras that can participate in the synchronous photographing at the expense of the quality of the photographing image, or prioritizing high quality of the synchronous photographing image at the expense of the number of the cameras that can participate in the synchronous photographing, in the same manner as the above-described first embodiment.

FIG. 9 is a flowchart illustrating a processing procedure of the slave camera executed by the control unit 3 of the slave camera according to the second embodiment. The control unit 3 of each of the slave cameras determines whether there is any notification of the executing conditions (executing conditions set in Step SF1 and the executing conditions corrected in Step SF9) from the master camera (Step SG1). In the case where there is a notification of the executing conditions from the master camera, the control unit 3 of the slave camera acquires the performance and the current state of the own camera (Step SG2).

Then, by comparing the acquired performance and the current state of the own camera with the executing conditions notified from the master camera, it is determined whether possible to participate in the synchronous moving image photographing under the notified executing conditions (Step SG3). Then, a result of this determination on possibility of participation is transferred and notified to the master camera (Step SG4).

Therefore, the master camera grasps the number of the slave cameras that can participate in the synchronous moving image photographing under the executing conditions originally set by the master camera and can properly determine whether to mitigate the setting conditions.

Then, loop processing from Step SG1 to Step SG6 is repeatedly executed until an instruction for executing the synchronous moving image photographing is received from the master camera (Step SG5). While repeatedly executing the loop processing, an instruction is given from the master camera to a selected slave camera to execute the photographing under the set (corrected) executing conditions at a time point that varies by the mode type: the "change unpermitted mode", "camera change permitted mode" or "conditions change permitted mode" (see Step SF10 described above). When the instruction to execute the synchronous moving image photographing execution is received from the master camera by the processing in Step SF11, the control unit 3 of the slave camera executes the synchronous moving image photographing under the designated executing conditions (Step SG6).

Needless to mention, there is a slave camera that does not receive the instruction for executing the synchronous moving image photographing from the master camera depending on the above-described executing conditions and the mode. As for the slave camera that does not receive the instruction of execution, the processing same as the first embodiment may be executed. More specifically, a time of the loop processing from Step SG1 to Step SG5 is measured, and when the measured time exceeds a predetermined value, the processing illustrated in the flowchart of FIG. 9 ends.

Otherwise, in Step SF11, the instruction is given to the selected slave camera to execute the synchronous moving image photographing under the set (corrected) executing conditions and simultaneously another instruction is given to the non-selected slave camera to stop (inhibit) executing the synchronous moving image photographing. On the other hand, the slave camera determines not only whether the instruction to execute the synchronous moving image photographing is received from the master camera in the above-described Step SG5 but also whether the instruction for inhibiting the same is received. In the case where the instruction for inhibiting execution is received, the processing in the flowchart illustrated in FIG. 9 ends.

After that, according to the second embodiment, the synchronous moving image photographing is executed in accordance with any one of following patterns.

(1) In the case where all of the cameras can participate in the synchronous moving image photographing under the executing conditions initially set by the master camera, all of the cameras execute the synchronous moving image photographing under the executing conditions. Therefore, in this case, the executing conditions initially set by the master camera are not mitigated and the synchronous moving image photographing is executed by all of the cameras included in the system.

(2) Under the initially set executing conditions, even when there is a slave camera that cannot participate in the synchronous moving image photographing, the master camera does not change and keeps the initially set executing conditions and the slave camera executes the synchronous moving image photographing under the executing conditions initially set by the master camera in the case where the "change unpermitted mode" is set. However, the slave camera that cannot execute such executes the synchronous moving image photographing under executing conditions as close to the executing conditions set by the master camera as possible. Therefore, in this case also, the synchronous moving image photographing is executed in all of the cameras included in the system without mitigating the executing conditions initially set by the master camera.

(3) In the case where there is a slave camera that cannot participate in the synchronous moving image photographing under the executing conditions initially set and further the "camera change permitted mode" is set, the slave cameras that can participate in the synchronous moving image photographing are selected and then the synchronous moving image photographing is executed. Therefore, in this case, the synchronous moving image photographing is executed in some of the cameras included in the system, but the synchronous photographing is executed without mitigating the executing conditions initially set.

(4) In the case where there is a slave camera that cannot participate in the synchronous moving image photographing under the executing conditions initially set and also the "conditions change permitted mode" is set, the master camera corrects and mitigates the executing conditions until all of the cameras can participate. When all of the slave cameras can participate as a result thereof, the master camera instructs to execute the synchronous moving image photographing under the corrected executing conditions. Therefore, in this case, the executing conditions initially set by the master camera are mitigated, but the synchronous moving image photographing is executed by all of the cameras included in the system.

Modified Embodiments

While the embodiments according to the present invention have been described, there are furthermore modified embodiments described below.

[1] According to the embodiments, a system photographing moving images has been described, but the embodiments may be applied to a system photographing still images, too. In this case also, the larger number of cameras is made to participate in the synchronous photographing, or synchronous photographing can be executed under higher level photographing conditions in the same manner as the system photographing the moving images.

[2] According to the embodiments, a plurality of factors such as a specific subject and brightness of an image are set as executing conditions at the time of setting processing of the executing conditions as illustrated in a flowchart of FIG. 5. However, it is also possible to set only the time length of synchronous moving image photographing as the executing conditions, and at the time of determining processing for possibility of participation in FIG. 6, battery residual capacity and memory residual capacity may be set as determination factors. This may prevent a situation in which photographing cannot be executed due to shortage of the battery or shortage of the memory, and also allows each camera to execute the moving image photographing for the same time length. Therefore, it is sure to achieve a basic object of the synchronous moving image photographing where the plurality of cameras executes the moving image photographing at least for the same time length.

[3] According to the embodiments, information related to performance and state are transmitted and received before stating the synchronous moving image photographing, but the information related to the performance and state may be transmitted and received after starting photographing. For example, a threshold of the battery capacity is preliminarily set, and when a slave camera has a value lower than the threshold, the state is notified to a master camera. The master camera having received the notification notifies each slave camera of inhibition of photographing, thereby surely achieving the basic object of the synchronous moving image photographing where the moving image photographing is executed for the same time length.

[4] Only a position and a direction may be set as the executing conditions. In this case, the master camera identifies a position of a subject based on the own position and the photographing direction, and also selects a plurality of slave cameras having a positional relation suitable for photographing the subject based on the position and the photographing direction transmitted from each slave camera. In this manner, it is possible to obtain a plurality of images photographed from an appropriate angle in accordance with a shape or characteristics of the subject.

[5] According to the embodiments, the master camera is configured to control a start and an end of photographing by the slave cameras, but it is also possible to control an exposure time in the moving image photographing therebetween. This may variably control timings of photographing each of frame images constituting a moving image in each camera.

[6] According to the embodiments, a case in which the same subject is synchronously photographed by a plurality of cameras has been described, but photographing may be executed in turn instead of synchronously. Also, the subject is not necessarily the same and may be a different one. In other words, in the case where the plurality of cameras executes photographing for a same purpose, common conditions may be set to execute the photographing.

The invention claimed is:

1. A photographing controller comprising:
a microcomputer which is configured to:
determine temporary conditions at a time of executing photographing by a plurality of cameras;
determine whether photographing by the plurality of cameras can be executed under the temporary conditions;
determine actual conditions at the time of executing photographing by the plurality of cameras in accordance with a determination result with respect to whether photographing by the plurality of cameras can be executed under the temporary conditions; and
control setting of the actual conditions in the plurality of cameras,
wherein the temporary conditions include any one of a plurality of conditions from among (a) conditions related to a number of cameras participating in the photographing, (b) conditions related to timings to execute photographing, (c) conditions related to whether all of the plurality of cameras can participate in the photographing under specified conditions, (d) conditions related to all of the cameras photographing a same subject, (e) battery residual capacity, and (f) sufficient residual capacity in a recording medium that records photographed images.

2. The photographing controller according to claim 1, wherein (i) in the case where the microcomputer determines that photographing by the plurality of cameras can be executed under the temporary conditions, the microcomputer determines the temporary conditions as the actual conditions, and (ii) in the case where the microcomputer determines that photographing by the plurality of cameras cannot be executed under the temporary conditions, the microcomputer changes the temporary conditions in accordance with the determination result to determine the actual conditions.

3. The photographing controller according to claim 2, wherein:
the temporary conditions or the actual conditions at the time of executing photographing by the plurality of cameras are conditions to be set in common between the plurality of cameras at the time of executing synchronous photographing in which photographing is executed for the same subject during a same time band, and
the microcomputer executes control such that the plurality of cameras executes the synchronous photographing under the actual conditions.

4. The photographing controller according to claim 1, wherein the temporary conditions further include (h) executing conditions to be executed by each of the cameras.

5. A photographing controller comprising:
a microcomputer which is configured to:
determine temporary conditions at a time of executing photographing by a plurality of cameras;
determine whether photographing by the plurality of cameras can be executed under the temporary conditions;
determine actual conditions at the time of executing photographing by the plurality of cameras in accordance with a determination result with respect to whether photographing by the plurality of cameras can be executed under the temporary conditions;
control setting of the actual conditions in the plurality of cameras; and
acquire performance or a state related to conditions of photographing by the plurality of cameras as predetermined information from a plurality of candidate cameras which are to be participating candidates for the photographing by the plurality of cameras,
wherein the microcomputer determines whether each of the plurality of candidate cameras has the performance or the state that enables participation in the photographing by the plurality of cameras under the temporary conditions based on the acquired predetermined information.

6. A photographing controller comprising:
a microcomputer which is configured to:
determine temporary conditions at a time of executing photographing by a plurality of cameras;
determine whether photographing by the plurality of cameras can be executed under the temporary conditions;
determine actual conditions at the time of executing photographing by the plurality of cameras in accordance with a determination result with respect to whether photographing by the plurality of cameras can be executed under the temporary conditions;
control setting of the actual conditions in the plurality of cameras; and
transmit the temporary conditions to each of the plurality of cameras,
wherein the microcomputer determines whether each of the plurality of cameras can participate in the photographing by the plurality of cameras under the temporary conditions based on information related to possibility of participation indicating possibility of participation in the photographing by the plurality of cameras transmitted from each of the plurality of cameras in response to transmission of the temporary conditions.

7. The photographing controller according to claim 1, wherein:
the temporary conditions further include (h) conditions for a plurality of candidate cameras to be participating candidates for photographing by the plurality of cameras and (i) executing conditions for photographing to be executed by each of the candidate cameras, the microcomputer determines whether all of the plurality of candidate cameras can participate in the photographing by the plurality of cameras under the executing conditions, and in the case where the microcomputer determines that all of the plurality of candidate cameras cannot participate in the photographing by the plurality of cameras under the executing conditions, the microcomputer changes the temporary conditions within a range in which both the number of the cameras participating in the photographing by the plurality of cameras and the executing conditions to be executed by each of the cameras are kept in a desired state, to determine the actual conditions.

8. The photographing controller according to claim 7, wherein in the case where the microcomputer changes the temporary conditions to determine the actual conditions, the microcomputer selects either a method of excluding a candidate camera determined to not be able to participate in the photographing by the plurality of cameras without changing the executing conditions or a method of changing the executing conditions without excluding a candidate camera determined to not be able to participate in the photographing by the plurality of cameras, to change the temporary conditions.

9. The photographing controller according to claim 7, wherein the microcomputer is further configured to specify restricting conditions that restrict a range of changing the temporary conditions, and wherein the microcomputer changes the temporary conditions within a range of the specified restricting conditions, to determine the actual conditions.

10. The photographing controller according to claim 9, wherein the restricting conditions include restricting conditions in changing the number of the cameras participating in synchronous photographing or restricting conditions for a range of changing the executing conditions.

11. The photographing controller according to claim 7, wherein:

the temporary conditions include (b) the conditions related to timings of executing the photographing by the plurality of cameras, the microcomputer determines whether all of the plurality of candidate cameras can immediately participate in the photographing by the plurality of cameras under the executing conditions, and in the case where the microcomputer determines that all of the plurality of candidate cameras cannot immediately participate in the photographing by the plurality of cameras under the executing conditions, the microcomputer changes the temporary conditions within a range in which all factors including the number of the cameras participating in the photographing by the plurality of cameras, the executing conditions executed by each of the cameras and a waiting time until executing the photographing by the plurality of cameras are kept in a desired state, to determine the actual conditions.

12. The photographing controller according to claim 11, wherein in the case where the microcomputer changes the temporary conditions to determine the actual conditions, the microcomputer selects one method from among a method of excluding a candidate camera determined to not be able to participate in the photographing by the plurality of cameras without changing the executing conditions, a method of changing the executing conditions without excluding the candidate camera determined to not be able to participate in the photographing by the plurality of cameras, and a method of waiting until all of the cameras can participate in the photographing by the plurality of cameras, to change the temporary conditions.

13. The photographing controller according to claim 6, wherein the microcomputer is configured to receive the temporary conditions transmitted from other cameras, and wherein the microcomputer is included in one of the cameras, and determines whether the camera in which it is included can participate in the photographing by the plurality of cameras under the received temporary conditions, wherein the microcomputer is further configured to transmit, to other cameras, predetermined information based on a determination result with respect to whether the camera in which it is included can participate in the photographing by the plurality of cameras under the received temporary conditions, and the microcomputer executes control such that the camera in which it is included executes photographing by the plurality of cameras under the actual conditions transmitted from other cameras in response to the transmitted predetermined information.

14. The photographing controller according to claim 1, wherein:

the microcomputer determines whether all of cameras to be participating candidates for the photographing by the plurality of cameras can participate in the photographing by the plurality of cameras under the temporary conditions, in the case where the microcomputer determines that all of the cameras can participate, the microcomputer executes photographing by the plurality of cameras under the temporary conditions as the actual conditions, the microcomputer is further configured to notify other cameras of a determination result in the case where it is determined that all of the cameras cannot participate, and the microcomputer waits until a camera among the plurality of cameras which is determined not be able to participate in the photographing by the plurality of cameras can participate.

15. The photographing controller according to claim 1, wherein the temporary conditions further include (h) performance by which all of the cameras can photograph moving images for a predetermined same time length and have the battery residual capacity which is sufficient to photograph the moving images or have the sufficient residual capacity in the recording medium that records the photographed moving images.

16. The photographing controller according to claim 1, wherein:

the temporary conditions are a state in which all of the cameras can photograph the same subject, the microcomputer is configured to detect a relation among the subject, a position, and a photographing direction of each camera that photographs the subject, and the microcomputer determines whether all of the cameras can photograph the same subject based on a detection result with respect to the relation among the subject, the position, and the photographing direction of each of the cameras.

17. The photographing controller according to claim 1, wherein:

the temporary conditions are set so that photographing functions from among a plurality of photographing functions which are made to function at the time of photographing and a setting value of the photographing functions are the same, the microcomputer is configured to set the photographing conditions of the photographing functions, the microcomputer is configured to check the photographing conditions for other cameras, the microcomputer determines whether the plurality of cameras can photograph under the set photographing conditions, and the microcomputer controls execution of the photographing by the plurality of cameras based on a check result with respect to the checking of the photographing conditions for the other cameras, such that the photographing conditions of the cameras participating in the photographing by the plurality of cameras are equalized.

18. A camera comprising an imaging sensor,
wherein a photographing controller according to claim 1 is included inside the camera.

19. A non-transitory recording medium having stored thereon a program that is executable by a computer to cause the computer to perform functions comprising:

determining temporary conditions at a time of executing photographing by a plurality of cameras;

determining whether photographing by the plurality of cameras can be executed under the temporary conditions;

determining actual conditions at the time of executing photographing by the plurality of cameras in accordance with a determination result with respect to whether photographing by the plurality of cameras can be executed under the temporary conditions; and controlling setting of the actual conditions in the plurality of cameras, wherein the temporary conditions include any one of a plurality of conditions from among (a) conditions related to a number of cameras participating in the photographing, (b) conditions related to timings to execute photographing, (c) conditions related to whether all of the plurality of cameras can participate in the photographing under specified conditions, (d) conditions related to all of the cameras photographing a same subject, (e) battery residual capacity, and (f) sufficient residual capacity in a recording medium that records photographed images.

20. A camera photographing control method, comprising:

determining temporary conditions at a time of executing photographing by a plurality of cameras;

determining whether photographing by the plurality of cameras can be executed under the temporary conditions;

determining actual conditions at the time of executing photographing by the plurality of cameras in accordance with a determination result with respect to whether photographing by the plurality of cameras can be executed under the temporary conditions; and controlling setting of the actual conditions in the plurality of cameras, wherein the temporary conditions include any one of a plurality of conditions from among (a) conditions related to a number of cameras participating in the photographing, (b) conditions related to timings to execute photographing, (c) conditions related to whether all of the plurality of cameras can participate in the photographing under specified conditions, (d) conditions related to all of the cameras photographing a same subject, (e) battery residual capacity, and (f) sufficient residual capacity in a recording medium that records photographed images.

* * * * *